(12) United States Patent
Nakayama et al.

(10) Patent No.: US 7,338,136 B2
(45) Date of Patent: Mar. 4, 2008

(54) ELECTRONIC BRAKING DEVICE

(75) Inventors: Masamobu Nakayama, Saitama (JP); Kazuya Takenouchi, Saitama (JP); Hideo Takahashi, Saitama (JP); Sumitaka Ogawa, Saitama (JP); Kazuhiko Tani, Saitama (JP); Yutaka Nishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/290,107

(22) Filed: Nov. 30, 2005

(65) Prior Publication Data

US 2006/0131953 A1 Jun. 22, 2006

(30) Foreign Application Priority Data

Dec. 16, 2004 (JP) ............................ 2004-364966
Jan. 19, 2005 (JP) ............................ 2005-011361

(51) Int. Cl.
*B60T 8/60* (2006.01)
(52) U.S. Cl. .......................................... 303/3; 303/155
(58) Field of Classification Search .................... 303/3, 303/15, 20, 155, 115.2, 122.09, 122.01
See application file for complete search history.

(56) References Cited

U.S. PATENT DOCUMENTS

| | | | | |
|---|---|---|---|---|
| 5,039,175 | A * | 8/1991 | Holzmann et al. ...... | 303/122.01 |
| 5,866,822 | A * | 2/1999 | Willig ......................... | 73/719 |
| 5,921,638 | A * | 7/1999 | Higashimura et al. ... | 303/116.1 |
| 5,954,407 | A * | 9/1999 | Schramm et al. ........... | 303/155 |
| 6,099,087 | A * | 8/2000 | Mortimer et al. ......... | 303/115.2 |
| 6,203,123 | B1 * | 3/2001 | Oyama ....................... | 303/191 |
| 6,244,675 | B1 * | 6/2001 | Behrends et al. ........... | 303/155 |
| 6,299,261 | B1 * | 10/2001 | Weiberle et al. .............. | 303/20 |
| 6,312,061 | B1 * | 11/2001 | Schliebe et al. ............... | 303/20 |
| 6,416,137 | B2 * | 7/2002 | Hofmann et al. ........ | 303/113.4 |
| 6,425,644 | B2 * | 7/2002 | Kawahata et al. .......... | 303/122 |
| 6,434,456 | B1 * | 8/2002 | Babala et al. ................. | 701/34 |
| 6,572,200 | B2 * | 6/2003 | Soga et al. ..................... | 303/3 |
| 6,843,537 | B2 * | 1/2005 | Babala et al. .......... | 303/122.09 |
| 2002/0140286 | A1 * | 10/2002 | Ishimura et al. ............ | 303/155 |

(Continued)

FOREIGN PATENT DOCUMENTS

DE 19510525 9/1996

(Continued)

*Primary Examiner*—Christopher P. Schwartz
(74) *Attorney, Agent, or Firm*—Carrier, Blackman & Associates, P.C.; Joseph P. Carrier; William D. Blackman

(57) ABSTRACT

An electronic braking device is provided which easily generates a braking force depending on the amount of brake operation in a range in which the amount of brake operation is small, just after the start of brake operation, and which protects a fluid pressure sensor from a fluid pressure beyond its tolerance. The electronic braking device activates a brake caliper through an electronic control unit (ECU) according to a signal in response to a braking request from a driver, and is provided with a first pressure sensor and a second pressure sensor for detecting the requested braking amount. The first pressure sensor and the second pressure sensor are different from each other in detection resolution and detection range. A relief valve unit r is provided which, when a fluid pressure above a prescribed level is applied to the master cylinder 3, relieves this fluid pressure.

16 Claims, 8 Drawing Sheets

U.S. PATENT DOCUMENTS

2003/0183024 A1  10/2003  Lohberg et al.

FOREIGN PATENT DOCUMENTS

| DE | 19841335 | 8/1999 |
| DE | 19920990 | 12/2000 |
| DE | 10324991 | 7/2004 |
| EP | 1176075 | 1/2002 |
| EP | 1277635 | 1/2003 |
| JP | 2000-264278 | 9/2000 |
| JP | 2001-509753 | 7/2001 |

* cited by examiner

ELECTRONIC BRAKING DEVICE

CROSS-REFERENCE TO RELATED APPLICATIONS

The present invention claims priority under 35 USC 119 based on Japanese patent applications No. 2004-364966, filed on Dec. 16, 2004 and No. 2005-011361, filed on Jan. 19, 2005. The subject matter of these priority documents is incorporated by reference herein.

BACKGROUND OF THE INVENTION

1. Field of the Invention

The present invention relates to an electronic braking device. In particular, the present invention relates to an electronic braking device for a vehicle such as, for example, for a motorcycle.

2. Description of the Background Art

A number of different designs for electronic braking devices, also known as by-wire type braking devices, are known. These types of braking devices detect the amount of the driver's brake operation, such as the pressure applied to a brake lever, and electrically perform braking according to the detection result. In this type of electronic braking device, the amount of brake operation is detected by a brake pedal sensor, and according to the detection result, an electric actuator activates a hydraulic modulator to apply a fluid pressure to a brake caliper and thereby brake the wheels. Such an electronic braking device is disclosed, for example, in Japanese published patent document JP-T No. 509753/2001.

The above electronic braking device must detect the amount of the driver's brake operation in an electrically wide range, and requires a sensor resolution which is high enough to cope with subtle changes in brake operation. For example, an excessively large input requires a wide dynamic range, and on a low-friction (μ) road surface such as a frozen road surface or manhole cover, a high resolution is required to cope with delicate brake operation. However, the use of a fluid pressure sensor that provides both a wide dynamic range and a high resolution results in a higher cost.

Therefore, the present invention provides an electronic braking device that easily generates a braking force depending on the amount of brake operation, in a range in which the amount of brake operation is small, including in the range just after the start of operation. As a result, the perceived feeling during braking is improved.

For vehicles such as motorcycles, there has been an electronic braking device in which a pressure sensor electrically detects a working fluid pressure corresponding to the amount of operation of a brake lever, brake pedal or the like, and according to the result of detection, an electric actuator actuates a hydraulic modulator to produce a fluid pressure and apply this fluid pressure to a brake caliper, thereby obtaining a braking force on wheels. This type of electronic braking device is disclosed, for example, in JP-A No. 264278/2000.

The above braking device has the following problem: it is possible that an unwanted excessive external force may be applied to the brake lever. As a result, the fluid pressure in the braking device excessively increases. A possible approach to coping with this excessive fluid pressure is to increase the tolerance of the fluid pressure sensor, but doing so would result in an unnecessary increase in cost.

Therefore, the present invention provides a braking device which protects the fluid pressure sensor from receiving a fluid pressure beyond its tolerance. By doing so, a breakdown of the fluid pressure sensor is prevented, and a change in its input/output characteristics is prevented. In addition, the fluid pressure sensor works rationally at low cost.

SUMMARY OF THE INVENTION

In order to solve the above problems, a first aspect of the invention is characterized in that an electronic braking device activates a wheel braking member (for example, a brake caliper 4 in an embodiment) through a controller (for example, an electronic control unit 20 in the embodiment). The wheel braking member is controlled according to an electronic signal generated in response to a braking request from a driver. The electronic braking device includes a plurality of sensors for detecting the requested braking amount (for example, first and second pressure sensors 28A and 29A, and third and fourth pressure sensors 28B and 29B in the embodiment). The sensors are different from each other in detection resolution and detection range. In this configuration, a signal with a wide dynamic range can be detected in response to the driver's braking request. In addition, the signal is detected with high accuracy even just after the start of brake operation. As a result, the perceived brake feeling is improved.

A second aspect of the invention is characterized in that the requested braking amount corresponds to a fluid pressure in a master cylinder (for example, a master cylinder 3 in the embodiment). The master cylinder produces working fluid pressure in conjunction with a brake operating unit (for example, a brake operating unit 2a or 2b in the embodiment), and the sensors are input-side fluid pressure sensors (for example, a first pressure sensor 28A and a second pressure sensor 28B in the embodiment) which detect a fluid pressure in the master cylinder. In this configuration, a master cylinder fluid pressure in a wide dynamic range can be detected and also with high accuracy even just after the start of brake operation. Thus, the perceived brake feeling can be further improved.

A third aspect of the invention is characterized in that a plurality of output-side fluid pressure sensors are provided for detecting a fluid pressure on the braking member (for example, a third pressure sensor 29A and a fourth pressure sensor 29B in the embodiment). These plural output-side fluid pressure sensors are different from each other in detection resolution and detection range. In this configuration, a fluid pressure on the braking member can be detected in a wide dynamic range and also with high accuracy even just after the start of brake operation.

A fourth aspect of the invention is characterized in that at least the respective detection ranges of the input-side fluid pressure sensors or the output-side fluid pressure sensors partially overlap. In this configuration, the detection ranges of plural fluid pressure sensors can be made seamless and continuous. Since the detection ranges of plural fluid pressure sensors can be made seamless and continuous, the fluid pressure on the braking member can be smoothly changed and thus an adequate braking force which matches the driver's brake operation can be obtained.

A fifth aspect of the invention is characterized in that the input-side fluid pressure sensors and the output-side fluid pressure sensors at least include fluid pressure sensors for low pressure (for example, the first pressure sensor 28A and third pressure sensor 29A in the embodiment) and fluid pressure sensors for high pressure (for example, the second pressure sensor 28B and fourth pressure sensor 29B in the embodiment). When the fluid pressure is below a prescribed level, the result of detection by a fluid pressure sensor for low pressure is used, and when the fluid pressure is above the prescribed level, the result of detection by a fluid pressure sensor for high pressure is used. In this configuration, a fluid pressure sensor for low pressure with a high detection resolution is used in a low fluid pressure range, while a fluid pressure sensor for high pressure with a wide detection range is used in a high fluid pressure range. As a result, an optimum fluid sensor is used over the whole detection range and a fluid pressure can be detected by the fluid pressure sensors in a wide dynamic range and also with high accuracy. Consequently, the brake feeling is improved.

A sixth aspect of the invention is characterized in that the sensors are diagnosed based on the result of detection by the sensors. In this configuration, if one of the sensors is out of order, it can be identified. Thus, the reliability of the sensors can be improved.

A seventh aspect of the invention is characterized in that in a braking device is provided which changes the fluid pressure applied to a front wheel or rear wheel braking member (for example, a brake caliper 4 in an embodiment) according to the extent of operation of a brake operating unit (for example, brake operating unit 2a or 2b in the embodiment). The braking device includes a fluid pressure sensor (for example, pressure sensor 28 in the embodiment) for detecting the fluid pressure in a master cylinder (for example, master cylinder 3 in the embodiment) interlocked with the brake controller. The braking device also includes a pressure reducing device (for example, relief valve unit r in the embodiment) which, when a fluid pressure above a prescribed level is applied to the master cylinder, relieves this fluid pressure. In this configuration, when a prescribed fluid pressure is reached, the pressure reducing device is activated to prevent input of a pressure above a prescribed level. As a result, it is possible to prevent a fluid pressure sensor from receiving a fluid pressure beyond its tolerance and avoid an unnecessary increase in cost.

An eighth aspect of the invention is characterized in that the pressure reducing device is located adjacent to the fluid pressure sensor in a hydraulic pipe (for example, main brake passage 5 in the embodiment) in which the fluid pressure sensor is installed. In this configuration, time lag between the fluid pressure at the fluid pressure sensor and the fluid pressure at the pressure reducing device is minimized. Since time lag between the fluid pressure at the fluid pressure sensor and the fluid pressure at the pressure reducing device is minimized, prevention of a fluid pressure sensor from receiving a fluid pressure beyond its tolerance is more certain, and the reliability of the fluid pressure sensor is improved.

A ninth aspect of the invention is characterized in that a plurality of fluid pressure sensors are provided as mentioned above. The fluid pressure sensors include a fluid pressure sensor for high pressure detection and a fluid pressure sensor for low pressure detection. In this configuration, even when a fluid pressure sensor for low pressure detection whose tolerance is low is also used for fluid pressure detection, the fluid pressure sensor for low pressure detection is protected. As a result, the breakdown of the pressure sensor or change in its input/output characteristics is prevented.

A tenth aspect of the invention is characterized in that the fluid pressure at which the pressure reducing device begins working is set to the performance limit fluid pressure value of one of the plural fluid pressure sensors. In this configuration, the working fluid pressure for the pressure reducing device can be set to the tolerance of a sensor with a lower tolerance, out of the plural fluid pressure sensors. Since the working fluid pressure for the pressure reducing device can be set to the tolerance of a sensor with a lower tolerance, out of the plural fluid pressure sensors, all fluid pressure sensors in use are surely protected.

An eleventh aspect of the invention is characterized in that an electromagnetic valve (for example, first electromagnetic valve V1 in the embodiment) is provided between the master cylinder, interlocked with the brake controller, and the braking member. In addition, the fluid pressure sensor is provided between the electromagnetic valve and the master cylinder. In this configuration, the fluid pressure sensor, located between the electromagnetic valve and the master cylinder, is protected. As a result, the fluid pressure sensor is prevented from receiving a fluid pressure beyond its tolerance, and the reliability of the fluid pressure sensor is improved.

A twelfth aspect of the invention is characterized in that a hydraulic modulator (for example, hydraulic modulator 6 in the embodiment) is connected with a main brake passage (for example, main brake passage 5 in the embodiment). The main brake passage connects the braking member and the master cylinder. A hydraulic modulator electromagnetic valve (for example, third electromagnetic valve V3 in the embodiment) is provided between the hydraulic modulator and the braking member. In addition, a second fluid pressure sensor as mentioned above (for example, pressure sensor 29 in the embodiment) is provided between the hydraulic modulator electromagnetic valve and the braking member. In this configuration, the second fluid pressure sensor, located between the hydraulic modulator electromagnetic valve and the braking member, is protected. As a result, the second fluid pressure sensor is prevented from receiving a fluid pressure beyond its tolerance, and the reliability of the fluid pressure sensor is improved.

A thirteenth aspect of the invention is characterized in that the fluid pressure sensor for high pressure detection and the fluid pressure sensor for low pressure detection overlap in their working ranges. In this configuration, when the fluid pressure sensor for high pressure detection and the fluid pressure sensor for low pressure detection, which overlap in their working ranges, are used, they are protected. As a result, a fluid pressure can be detected in a wide pressure range from low to high, and the reliability is further improved.

A fourteenth aspect of the invention is characterized in that in a braking device which changes the fluid pressure applied to a front wheel or rear wheel braking member (for example, brake caliper 4 in the embodiment) according to the extent of operation of a brake operating unit (for example, brake operating unit 2a or 2b in the embodiment), a second fluid pressure sensor (for example, pressure sensor 29 in the embodiment) for detecting the fluid pressure applied to the braking member is provided; and a pressure reducing device (for example, relief valve unit r in the embodiment) which, when a prescribed fluid pressure is applied to the braking member, relieves this fluid pressure is provided. In this configuration, when the fluid pressure of the braking member reaches a prescribed fluid pressure, the pressure reducing device is activated to prevent application of a pressure above a prescribed level. As a result, it is possible to prevent the second fluid pressure sensor from receiving a fluid pressure above its tolerance and avoid an unnecessary increase in cost.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
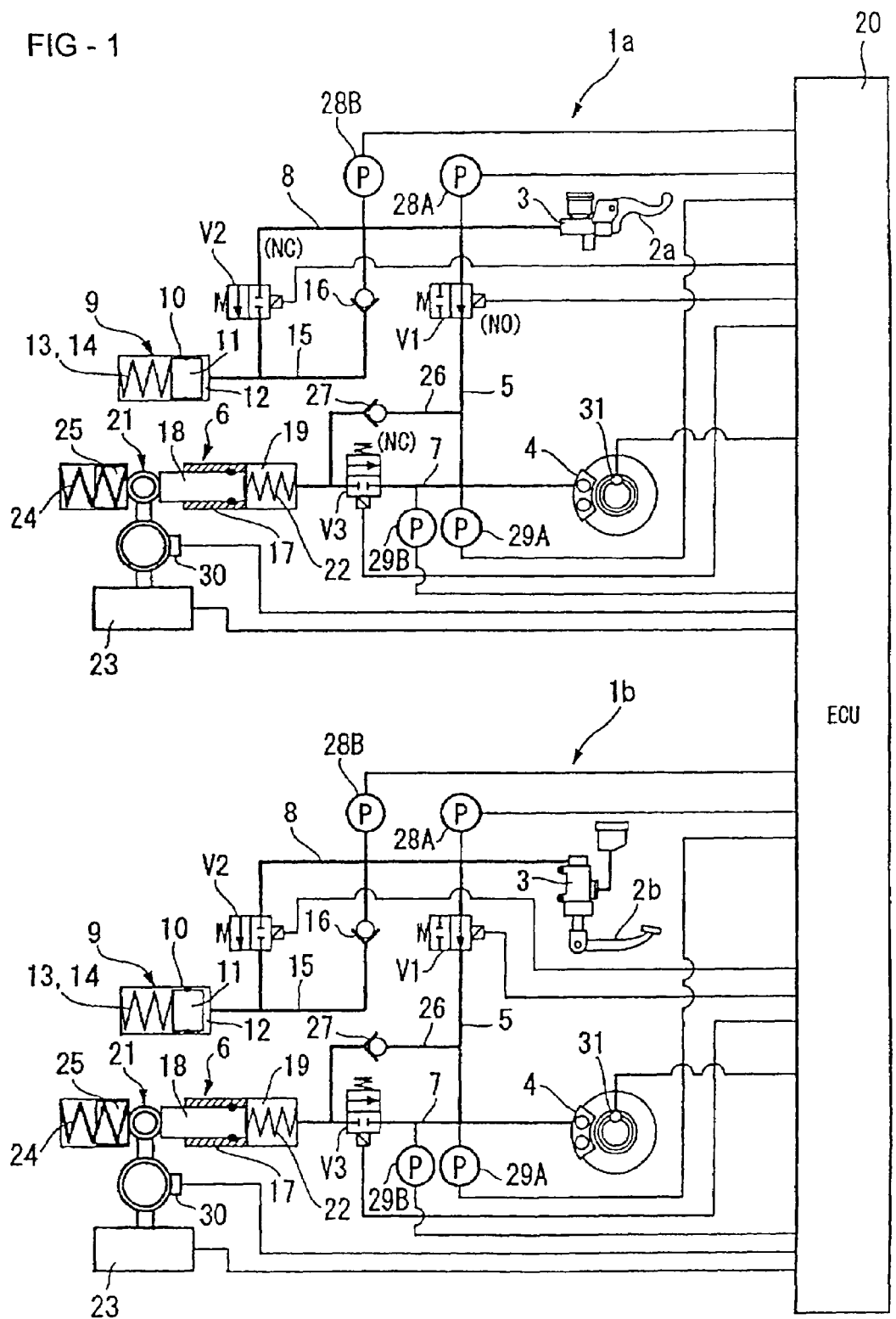
FIG. 1 is a schematic fluid pressure circuit diagram of an electronic braking device for a motorcycle according to an embodiment of the present invention.

FIG. 1 is a hydraulic circuit diagram of an electronic braking device for a motorcycle according to a first embodiment of the present invention. As shown in the figure, the electronic braking device in this embodiment consists of a front wheel brake circuit 1a and a rear wheel brake circuit 1b which are independent of each other and connected via an electronic control unit (ECU) 20.

The front wheel brake circuit 1a and the rear wheel brake circuit 1b are substantially structurally the same, except that for brake control, the front wheel brake circuit 1a relies on a brake lever 2a as a brake operating unit 2 and the rear wheel brake circuit 1b relies on a brake pedal 2b as a brake operating unit 2. Therefore, only the front wheel brake circuit 1a will be described in detail, and the elements of the rear wheel brake circuit 1b which are the same as those of the front wheel brake circuit 1a are designated by the same reference numerals and their descriptions are omitted.

The electronic braking device employs an electronic (by-wire) brake system for both the front and rear wheels, where the amount of operation (fluid pressure in this embodiment) of a brake operating unit such as the brake lever 2a is electrically detected, and a fluid pressure, which is produced by a hydraulic modulator 6 according to the detected value, is used to generate a braking force.

The electronic braking device also employs a Combined Brake System, hereinafter called "CBS", in which, when either of the front wheel and rear wheel is braked, the front and rear wheel braking members work in conjunction with each other for braking operation. Furthermore, the electronic braking device also employs an Anti-lock Brake System, hereinafter called "ABS", which generates an adequate braking force even if the brake is operated inadequately.

The brake circuits 1a and 1b each comprise a master cylinder 3 interlocked with the brake operating unit 2, and a brake caliper (braking member) 4 operatively connected to the master cylinder 3. The master cylinder 3 and the brake caliper 4 are connected by a main brake passage 5. A hydraulic modulator 6 (explained later) is joined and connected to a mid portion of the main brake passage 5, through a supply-drain passage 7.

A normally-open type (NO) first electromagnetic valve V1, which connects or disconnects the master cylinder 3 and the brake caliper 4, is inserted in the main brake passage 5 at a location between the master cylinder 3 and the supply-drain passage 7. A branch passage 8 is connected to the main passage 5 between the master cylinder 3 and the first electromagnetic valve V1. In this embodiment, in the brake circuits 1a and 1b, the portion from the first electromagnetic valve V1 to the master cylinder 3 is defined as the brake input side. Moreover, the portion from the first electromagnetic valve V1 to the brake caliper 4 is defined as the brake output side. The branch passage 8 includes a normally-closed type (NC) second electromagnetic valve V2 connected to a fluid loss simulator 9. The fluid loss simulator 9 applies a pseudo hydraulic reaction force to the master cylinder 3 according to the extent of operation of the brake operating unit 2 when the above first electromagnetic valve V1 closes the main brake passage 5. When a reaction force is applied, this second electromagnetic valve V2 opens the branch circuit 8 to connect the master cylinder 3 and the fluid loss simulator 9.

The fluid loss simulator 9 is structured as follows: a piston 11 is housed in a cylinder 10 so as to move forward and backward freely. Between the cylinder 10 and the piston 11, there is a fluid chamber 12 which receives working fluid flowing from the master cylinder 3. Coil springs 13 and 14, which are different in characteristics, are connected in series behind the piston 11, and these two springs 13 and 14 give the piston 11 (and thus brake operating unit 2) a reaction force which initially gradually rises, and then sharply rises at a stroke end.

The branch passage 8 includes a bypass passage 15 which passes around the second electromagnetic valve V2. In this bypass passage 15, there is a return check valve 16 which permits flow of working fluid from the fluid loss simulator 9 toward the master cylinder 3.

The hydraulic modulator 6 includes a cam mechanism 21 which presses a piston 18 in a cylinder 17 toward a hydraulic chamber 19 formed between the cylinder 17 and the piston 18. The hydraulic modulator 6 also includes a return spring 22 which constantly urges the piston 18 against the cam mechanism 21, and an electric motor 23 which drives the cam mechanism 21. The hydraulic chamber 19 is connected to the supply-drain passage 7. A neutral reference position for the piston is defined as an almost central position along the length of the cylinder 17. By pressing the piston 18 with respect to the neutral reference position by means of the cam mechanism 21 driven by the electric motor 23, or moving the piston 18 back through the return spring 22, the hydraulic modulator 6 increases or decreases the pressure in the hydraulic chamber 19 and thereby increases or decreases the braking pressure of the brake caliper 4.

By adjusting the current value, determined by an input duty ratio (ON time/ON time+OFF time), by means of pulse width modulation (PWM) control of the electric motor 23, the position of the piston 18, which depends on the rotational position of the cam mechanism 21, is electrically adjusted accurately and easily to adjust the pressure in the hydraulic chamber 19.

In the above cam mechanism 21, a lifter 25, whose stroke is limited by a stopper (not shown) through a backup spring 24, is disposed in a way to move forward and backward freely. The piston 18 is constantly pressed by this lifter 25 toward the direction in which the volume of the hydraulic chamber 19 is reduced. Consequently, when the electric motor 23 is turned off, the lifter 25 is pressed by the backup spring 24 and stopped by the stopper so that the piston 18 returns to the neutral reference position.

Thus, CBS control which actively supplies working fluid to the main brake passage 5 (brake caliper 4) and ABS control which moves the piston 18 forward and backward to decrease, hold or again increase the pressure in the hydraulic chamber 19 can be both performed by the brakeing device of the above described configuration.

A third normally-closed type (NC) valve V3 is disposed in the above supply-drain passage 7. The supply-drain passage 7 includes a bypass passage 26 which passes around the third electromagnetic valve V3. In the bypass passage 26, there is a return check valve 27 which permits flow of working fluid from the hydraulic modulator 6 toward the brake caliper 4.

In the front wheel brake circuit 1a and the rear wheel brake circuit 1b, on the brake input side, that is, in the portion of the circuit from the first electromagnetic valve V1 to the master cylinder 3, there are disposed a first pressure sensor (input side fluid pressure sensor, fluid pressure sensor for low pressure) 28A and a second pressure sensor (input side fluid pressure sensor, fluid pressure sensor for high pressure) 28B. In addition, on the brake output side, that is, in the portion of the circuit from the first electromagnetic valve V1 to the brake caliper 4, there are disposed a third pressure sensor (output side fluid pressure sensor, fluid pressure sensor for low pressure) 29A and a fourth pressure sensor (output side fluid pressure sensor, fluid pressure sensor for high pressure) 29B.

The first pressure sensor 28A and second pressure sensor 28B on the brake input side are different from each other in detection range, and the third pressure sensor 29A and fourth pressure sensor 29B on the brake output side are different from each other in detection range. Concretely, the first and third pressure sensors 28A and 29A detect a fluid pressure in a low pressure range, and the second and fourth pressure sensors 28B and 29B detect a fluid pressure in a high pressure range.

In this embodiment, the detection range of the first and third pressure sensors 28A and 29A (for example, 0-3 MPa or so) is narrower than the detection range of the second and fourth pressure sensors 28B and 29B (for example, 0-10 MPa or so). On the other hand, the detection resolution of the first and third pressure sensors 28A and 29A (for example, 3 MPa×0.001 or so) is higher than the detection resolution of the second and fourth pressure sensors 28B and 29B (for example, 10 MPa×0.001 or so). The first and third pressure sensors 28A and 29A are the same as the second and fourth pressure sensors 28B and 29B in terms of the lower limit of the detection range, but the second and fourth pressure sensors 28B and 29B are larger than the first and third pressure sensors 28A and 29A in terms of the upper limit of the detection range.

The first and third pressure sensors 28A and 29A, and the second and fourth pressure sensors 28B and 29B are used as follows: when the detected value is smaller than a predetermined threshold, the detected value of the first and third pressure sensors 28A or 29A is used. When it is larger than or equal to the predetermined threshold, the detected value of the second and fourth pressure sensors 28B or 29B is used. Thus, the first and third pressure sensors 28A and 29A cover pressures which cannot be detected with the detection resolution of the second and fourth pressure sensors 28B and 29B.

The cam shaft (not shown) of the cam mechanism 21 has an angle sensor 30 for angle information feedback and the brake caliper 4 has a wheel speed sensor 31 for detecting the wheel speed.

The electronic control unit 20 opens or closes the first electromagnetic valve V1, second electromagnetic valve V2, and third electromagnetic valve V3 according to detection signals from the first pressure sensor 28A and second pressure sensor 28B on the brake input side, detection signals from the third pressure sensor 29A and fourth pressure sensor 29B on the brake output side, a detection signal from the angle sensor 30 and a detection signal from the wheel speed sensor 31, thereby controlling operation of the electric motor 23.

For example, how braking is accomplished on the front wheel will be concretely described next. When an ignition switch (not shown) is off or turned on, as shown in FIG. 1, in the front and rear wheel brake circuits 1a and 1b, the first to third electromagnetic valves V1, V2, and V3 are all electrically off. As a result, the first electromagnetic valve V1 is open, the second electromagnetic valve V2 is closed and the third electromagnetic valve V3 is closed. Hence, the fluid pressure produced by the master cylinder 3 can be directly supplied to the brake caliper 4. This state is maintained until the vehicle speed reaches a prescribed vehicle speed (for example, several kilometers/hour). Alternatively, this state may be maintained when the vehicle speed is not zero.

Figure 2:
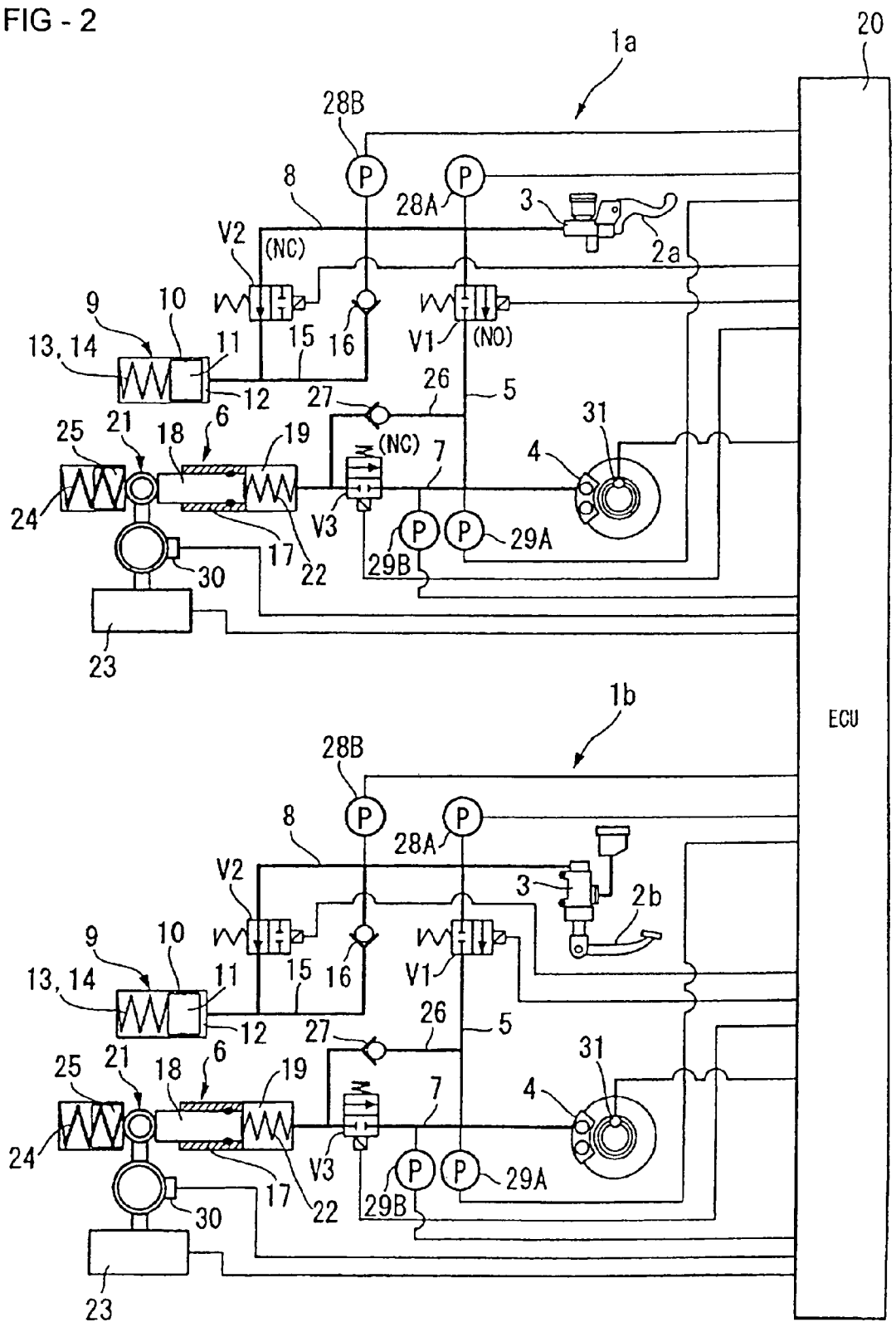
FIG. 2 is a schematic fluid pressure circuit diagram of the electronic braking device of FIG. 1 in a standby state according to an embodiment of the present invention.

When the vehicle speed reaches the prescribed vehicle speed, a rated current is supplied to the first electromagnetic valve V1 and the second electromagnetic valve V2. Consequently, as shown in FIG. 2, the first electromagnetic valve V1 closes, which shuts off the main brake passage 5; at the same time, the second electromagnetic valve V2 opens, which connects the master cylinder 3 and the fluid loss simulator 9 through the branch passage 8 and main brake passage 5. At this moment, the third electromagnetic valve V3 is electrically held off and thus closed.

After the rated current is used to close the first electromagnetic valve V1 and open the second electromagnetic valve V2 in this way, the current supplied to the first electromagnetic valve V1 and second electromagnetic valve V2 is lowered to a working state holding current level (hereinafter this state is called the standby state). Here, the working state holding current means a current with a current value predetermined so as to hold the working state of an electromagnetic valve; and it is far smaller than the rated current. Power consumption is reduced by holding the standby state with the working state holding current in this way.

Figure 3:
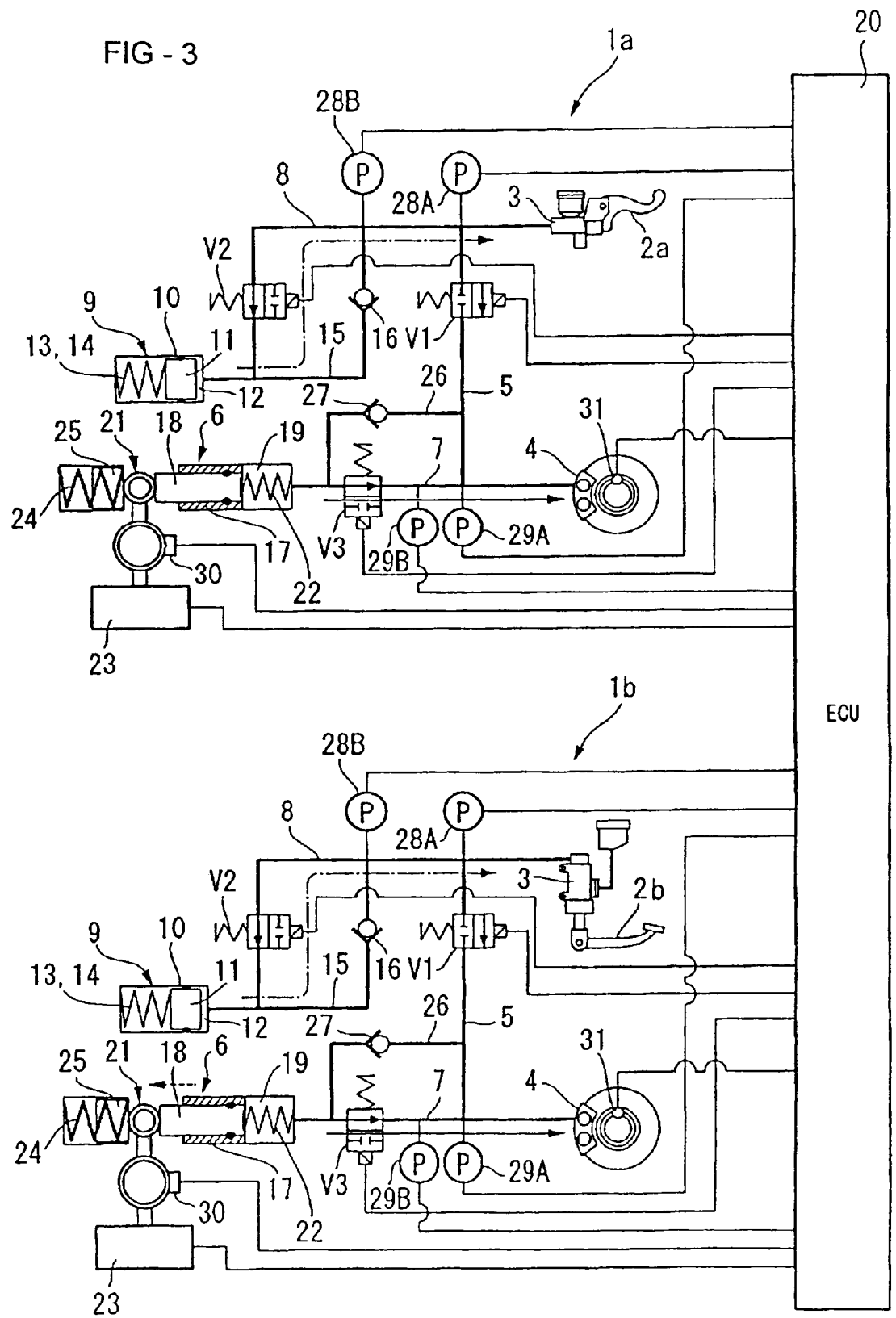
FIG. 3 is a schematic fluid pressure circuit diagram of the electronic braking device of FIG. 1 in a braking state according to an embodiment of the present invention.

Then, when a brake signal is inputted to the electronic control unit 20 by operation of the brake operating unit 2 (i.e. there is a brake input), as shown in FIG. 3, the rated current is again supplied to the first electromagnetic valve V1 and second electromagnetic valve V2 to ensure that the first electromagnetic valve V1 is held closed and the second electromagnetic valve V2 is held open. At the same time, the rated current is supplied to the third electromagnetic valve V3 to open the third electromagnetic valve V3 and connect the hydraulic modulator 6 and the brake caliper 4 through the supply-drain passage 7 and main brake passage 5.

This permits the rider to perceive a brake feeling which is independently and separately (ie, virtually) reproduced by the fluid loss simulator 9 (see the broken line arrow in the front wheel brake circuit 1a in FIG. 3). At the same time, change in fluid pressure due to operation of the hydraulic modulator 6 is not transmitted to the brake operating unit 2 because the first electromagnetic valve V1 is closed. In parallel with this, depending on the detected value of the first pressure sensor 28A (or the second pressure sensor 28B) on the brake input side, the electric motor 23 for the hydraulic modulator 6 starts running. As a result, the cam mechanism 21 presses the piston 18 to pressurize the working fluid in the hydraulic chamber 19. As a further consequence, the fluid pressure depending on the detected value of the first pressure sensor 28A (or the second pressure sensor 28B) on the brake input side is supplied through the main brake passage 5 to the brake caliper 4 (see the solid line arrow in the front wheel brake circuit 1a in FIG. 3).

If it is found during this front wheel braking process that the speed difference between the front wheel and the vehicle body exceeds a prescribed value, the electronic control unit 20 controls the electric motor 23 to move the piston 18 back, and thereby lower the braking pressure of the brake caliper 4 to suppress the speed difference between the wheel and the vehicle body by ABS control.

As mentioned above, when the vehicle reaches a prescribed vehicle speed, the first electromagnetic valve V1 closes and the second electromagnetic valve V2 opens so that the brake circuit 1a comes into the standby state. Therefore, the master cylinder 3 is held isolated from the hydraulic modulator 6 and the brake caliper 4 when the brake is off. As a consequence, when the brake is on, the operation stroke of the brake operating unit 2 is stabilized and the perceived brake feeling is improved. Also, upon brake input, the hydraulic modulator 6 immediately produces a fluid pressure and achieves a stable braking performance.

When one brake operating unit 2 (2a or 2b) is operated, the speed of the front/rear wheel is inputted from the wheel speed sensor 31 to the electronic control unit 20 and information on the amount of brake operation (fluid pressure on the brake input side) is inputted through the above pressure sensor 28 to the electronic control unit 20. Then, according to an instruction from the electronic control unit 20, the hydraulic modulator 6 in the other brake circuit supplies a fluid pressure depending on vehicle driving conditions and brake operation, to the brake caliper 4 in the other brake circuit by CBS control.

For example, if the rider first operates the brake lever 2a as the front wheel brake operating unit 2 during driving, the abovementioned braking sequence takes place in the front wheel brake circuit 1a. In parallel with this, in the rear wheel brake circuit 1b (operated later), the rated current is supplied to the first electromagnetic valve V1 and second electromagnetic valve V2 to ensure that the first electromagnetic valve V1 is held closed and the second electromagnetic valve V2 is held open. At the same time, the rated current is supplied to the third electromagnetic valve V3 solenoid to open the third electromagnetic valve V3 and connect the hydraulic modulator 6 and the brake caliper 4 through the supply-drain passage 7 and main brake passage 5.

This gives the rider a brake feeling on the rear wheel as well, which is separately and distantly (virtually) reproduced by the fluid loss simulator 9 (see the broken line arrow in the rear wheel brake circuit 1b in FIG. 3). At the same time, change in fluid pressure due to operation of the hydraulic modulator 6 is not transmitted to the brake operating unit 2 because the first electromagnetic valve V1 is closed. In parallel with this, the electric motor 23 for the hydraulic modulator 6 starts running and the cam mechanism 21 presses the piston 18 to pressurize the working fluid in the hydraulic chamber 19. As a consequence, the fluid pressure, depending on control of the electric motor 23, is supplied through the main brake passage 5 to the brake caliper 4 (see the solid line arrow in the rear wheel brake circuit 1b in FIG. 3).

The fluid pressure, supplied from the hydraulic modulator 6 to the brake caliper 4, is so controlled that the ratio of the fluid pressures of the front and rear brake calipers 4 is a predetermined distribution ratio. Furthermore, when the above wheel speed sensor 31 detects that the rear wheel is about to lock under such CBS control, the electronic control unit 20 controls the electric motor 23 to move the piston 18 back and lower the braking pressure of the braking caliper 4 and, under ABS control, prevents the wheel from locking.

The above explanation of CBS control assumes that the front wheel brake operating unit 2a is first operated; however, even when the rear wheel brake operating unit 2b is first operated, similarly a reaction force is given to the front wheel brake operating unit 2a by the fluid loss simulator 9 and at the same time a braking pressure is given to the brake caliper 4 by the hydraulic modulator 6 in the front wheel brake circuit 1a.

As described above, in this motorcycle electronic braking device, in each of the brake circuits 1a and 1b, before the vehicle speed reaches a prescribed vehicle speed, the first electromagnetic valve V1 is open, so the brake input side and the brake output side are connected by the main brake passage 5. However, when the vehicle speed exceeds the prescribed vehicle speed, the first electromagnetic valve V1 closes and the main brake passage 5 is shut off, and consequently the brake input side and the brake output side are disconnected.

In the conventional system in which only one pressure sensor is provided on the brake input side, as the rider operates the brake operating unit 2, the fluid pressure produced by the master cylinder 3 rises from 0 Mpa. In the conventional system, a fluid pressure in a very low pressure range, for example around 0 Mpa, cannot be detected. On the other hand, in this embodiment, since the first pressure sensor for low pressure 28A and the second pressure sensor for high pressure 28B are provided on the brake input side, and the third pressure sensor for low pressure 29A and the fourth pressure sensor for high pressure 29B are provided on the brake output side, fluid pressures in a pressure range from very low to high can be detected with high accuracy.

Since the second and fourth pressure sensors 28B and 29B are low in detection resolution and, in a range in which fluid pressure change is small, the influence of a "dead zone" in which they don't detect fluid pressure change tends to be considerable. However, in the high braking force range covered by the second and fourth pressure sensors 28B and 29B, the brake feeling is not affected even when a very small change in fluid pressure is not detected.

Figure 4:
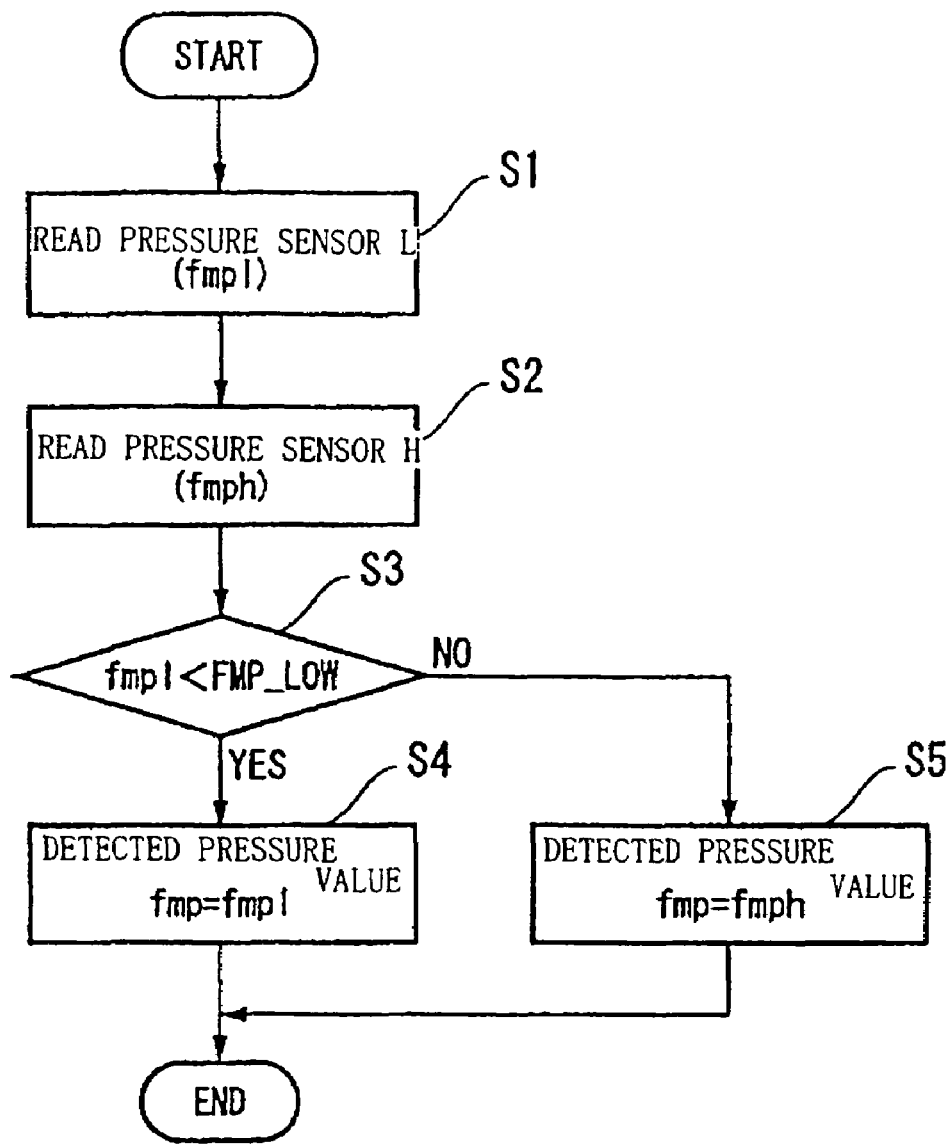
FIG. 4 is a flowchart showing a pressure sensor switching process according to an embodiment of the present invention.

Next, the pressure sensor switching process will be explained referring to the flowchart in FIG. 4. Output from the first pressure sensor and the second pressure sensor is inputted to the electronic control unit 20. Through this process, the controller decides which pressure sensor is used. The flowchart explains the process, taking the front wheel side as an example.

First, at step S1, the detected value of the first pressure sensor (pressure sensor L), fmp1, is read and at step S2, the detected value of the second pressure sensor (pressure sensor H), fmph, is read. Then, at step S3, whether the detected value fmp1 is lower than a predetermined low pressure threshold FMP_LOW or not is decided. If the decision is "YES" (fmp1<FMP_LOW), the process goes to step S4; if the decision is "NO" (fmp1≧FMP_LOW), the process goes to step S5.

Then, at step S4, the detected value of the first pressure sensor, fmp1, is set as detected pressure value fmp and the process is ended. On the other hand, at step S5, the detected value of the second pressure sensor, fmph, is set as detected pressure value fmp and the process is ended. The second pressure sensor must be able to read a value which exceeds the detection range of the first pressure sensor. Here, the above low pressure threshold FMP_LOW may be set as the upper limit of the detection range of the first pressure sensor.

Figure 5:
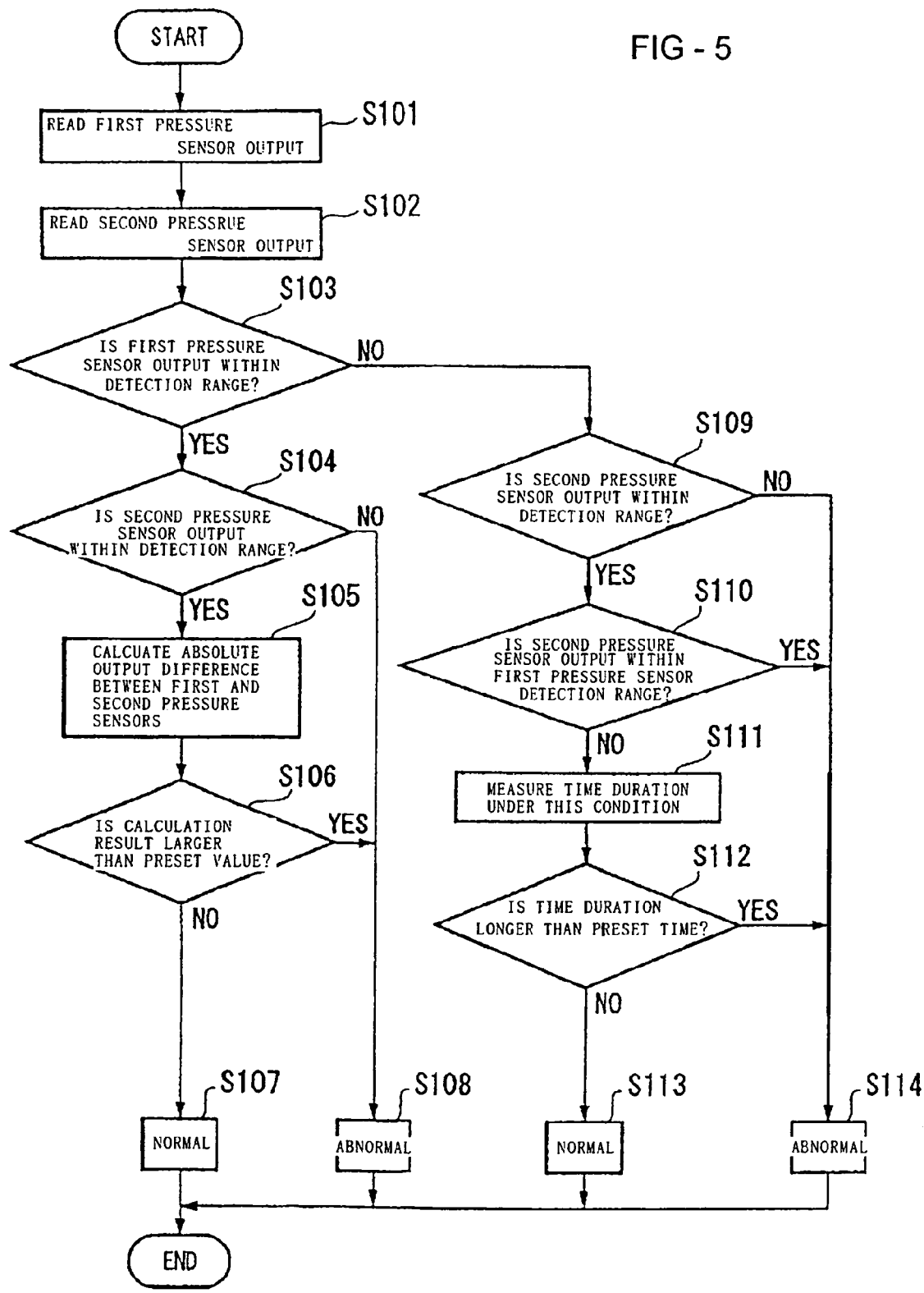
FIG. 5 is a flowchart showing a pressure sensor diagnosis process according to an embodiment of the present invention.

Next, the process of diagnosing the pressure sensors (first pressure sensor 28A and second pressure sensor 28B) on the brake input side will be explained referring to the flowchart in FIG. 5. FIG. 5 explains the diagnosis process for input side pressure sensors. Since the process for the output side pressure sensors (third pressure sensor 29A and fourth pressure sensor 29B) is the same as for the input side ones, an explanation of the diagnosis process for the output side pressure sensors is omitted.

First, at step S101, the detected value of the first pressure sensor (hereinafter, output), P1, is read. At step S102, the detected value of the second pressure sensor (hereinafter, output), P2, is read. Then, the process goes to step S103. At step S103, it is determined whether or not output P1 of the first pressure sensor is within the detection range of the first pressure sensor. Here, for both the first and second pressure sensors, "output out of the detection range" includes both negative output and the maximum output (upper limit) of the respective pressure sensor.

If the decision at step S103 is "YES" (output P1 of the first pressure sensor is within the detection range of the first pressure sensor), the process goes to step S104. At step S104, it is determined whether or not output P2 of the second pressure sensor is within the detection range of the second pressure sensor. If the decision at step S104 is "YES" (output P2 of the second pressure sensor is within the detection range of the second pressure sensor), the process goes to step S105 and the absolute value of the difference between output P1 of the first pressure sensor and output P2 of the second pressure sensor is calculated (|ΔP|=|P1−P2|).

Next, the process goes to step S106. At step S106 it is determined whether or not the absolute value of the output difference calculated at step S105 is larger than a predetermined value p. If the decision at step S106 is "NO" ((|ΔP|≦p), the process goes to step S107, and the first pressure sensor and the second pressure sensor are both determined to be normal and execution of this routine is ended. In other words, on the brake input side, output of the first pressure sensor and output of the second pressure sensor almost agree, so they are determined to be normal.

On the other hand, if the decision at step S104 is "NO" (output P2 of the second pressure sensor is out of the detection range of the second pressure sensor), the second pressure sensor is suspected to be out of order. If the decision at step S106 is "YES" (|ΔP|>p), either the first pressure sensor or the second pressure sensor is suspected to be out of order, and the process goes to step S108. At step S108, it is determined that there is an abnormality, and execution of this routine is ended.

If the decision at step S103 is "NO" (output P1 of the first pressure sensor is out of the detection range of the first pressure sensor), the process goes to step S109. At step S109, it is decided whether or not output P2 of the second pressure sensor is within the detection range of the second pressure sensor. If the decision at step S109 is "YES" (output P2 of the second pressure sensor is within the detection range of the second pressure sensor), the process goes to step S110. At step S110, it is determined whether or not output of the second pressure sensor is within the detection range of the first pressure sensor. If the decision at step S110 is "NO" (output of the second pressure sensor is out of the detection range of the first pressure sensor 28A), the process goes to step S111 and time duration t for which the condition for decision "NO" at step S110 lasts is measured.

Next, the process goes to step S112. At step S112 it is determined whether time duration t measured at step S111 is longer than a preset time t1 or not (i.e. whether it exceeds preset time t1 or not). Here, preset time t1 is standard time which it takes for a running vehicle to stop after the brake is applied. The value t1 is previously determined based on experimentation or the like, and is preset.

If the decision at step S112 is "NO" (t≦t1), the process goes to step S113, and the first pressure sensor and the second pressure sensor are determined to be normal and execution of this routine is ended. In this case, output P1 of the first pressure sensor is considered to be temporarily out of the detection range and thus the sensors are decided to be normal.

If the decision at step S112 is "YES" (t>t1), the second pressure sensor may be out of order because it is usually impossible that the fluid pressure on the brake input side remains high but the vehicle does not stop within the preset time t1. Therefore, the process goes to step S114 where it is determined that there is an abnormality, and execution of this routine is ended.

If the decision at step S109 is "NO" (output of the second pressure sensor is out of the detection range of the second pressure sensor) or the decision at step S110 is "YES" (output of the second pressure sensor is out of the detection range of the first pressure sensor), at least either the first pressure sensor or the second pressure sensor is suspected to be out of order and the process goes to step S114, and it is determined that there is an abnormality and execution of this routine is ended.

If it is decided at step S108 or S114 that there is an abnormality, the first to third electromagnetic valves are all turned off. As a result, the first electromagnetic valve is made constantly open, the second electromagnetic valve constantly closed and the third electromagnetic valve constantly closed and the brake system is switched from the electronic (by-wire) system to the conventional system in which the fluid pressure produced by the master cylinder is directly supplied to the brake caliper.

Therefore, according to the above embodiment, the presence of two pressure sensors on the brake input side, the first pressure sensor 28A and the second pressure sensor 28B, makes it possible to detect fluid pressures in the master cylinder 3 in a wide dynamic range from very low fluid pressure to high pressure with high accuracy, and according to the result of such detection, the braking force on the wheels can be smoothly controlled from just after the start of operation of the brake, so that the brake feeling is improved.

Feedback control of the fluid pressure produced by the hydraulic modulator 6 is done using the third pressure sensor 29A and fourth pressure sensor 29B on the brake output side so that the braking force on the wheels rises smoothly with no unevenness in the rise of the fluid pressure which works on the brake caliper 4. Even in a situation that delicate brake operation is repeated, for example, on a very low-friction ($\mu$) road surface such as a frozen road surface or manhole cover, change in fluid pressure is detected by the first and third pressure sensors 28A and 29A and the second and fourth pressure sensors 28B and 29B; and a braking force depending on it can be generated so that delicate brake control can be achieved.

Furthermore, two pressure sensors, namely the first pressure sensor 28A and second pressure sensor 28B, are provided on the brake input side and a diagnosis process is performed by comparison in output between these pressure sensors 28A and 28B, so that even when the brake input side and the brake output side are disconnected, the pressure sensors 28A and 28B on the brake input side can be diagnosed.

Also, according to this diagnosis process (diagnosis method), since the detection range is partially different between the first pressure sensor 28A and the second pressure sensor 28B, diagnosis can be made easily and accurately and if a defect is found, it is easier to decide which of the first pressure sensor 28A and second pressure sensor 28B is more likely to have the defect.

In the above embodiment, electronic signals may be related not only to pressures, but also to brake control unit strokes. In addition, in the above embodiment, the detection range is divided into two ranges, namely a low pressure range and a high pressure range. However, the detection range may be divided into three or more ranges. As far as the electronic braking device is designed for a vehicle, its application is not limited to motorcycles.

Furthermore, although the above embodiment exemplifies an electronic (by-wire) type electronic braking device which has ABS and CBS, the present invention may be embodied in the form of a by-wire type electronic braking device which does not have ABS or CBS.

Moreover, the present invention can be embodied in the form of an electronic braking device in which, when CBS control or ABS control is not performed, the brake input side and the brake output side are connected and the fluid pressure produced on the brake input side is supplied to the brake caliper to generate a braking force, and only when CBS control or ABS control is preformed, the brake input side and the brake output side are disconnected and the hydraulic modulator modulates the fluid pressure on the brake output side and supplies the modulated fluid pressure to the brake caliper and thus adjusts the braking force.

Figure 6:
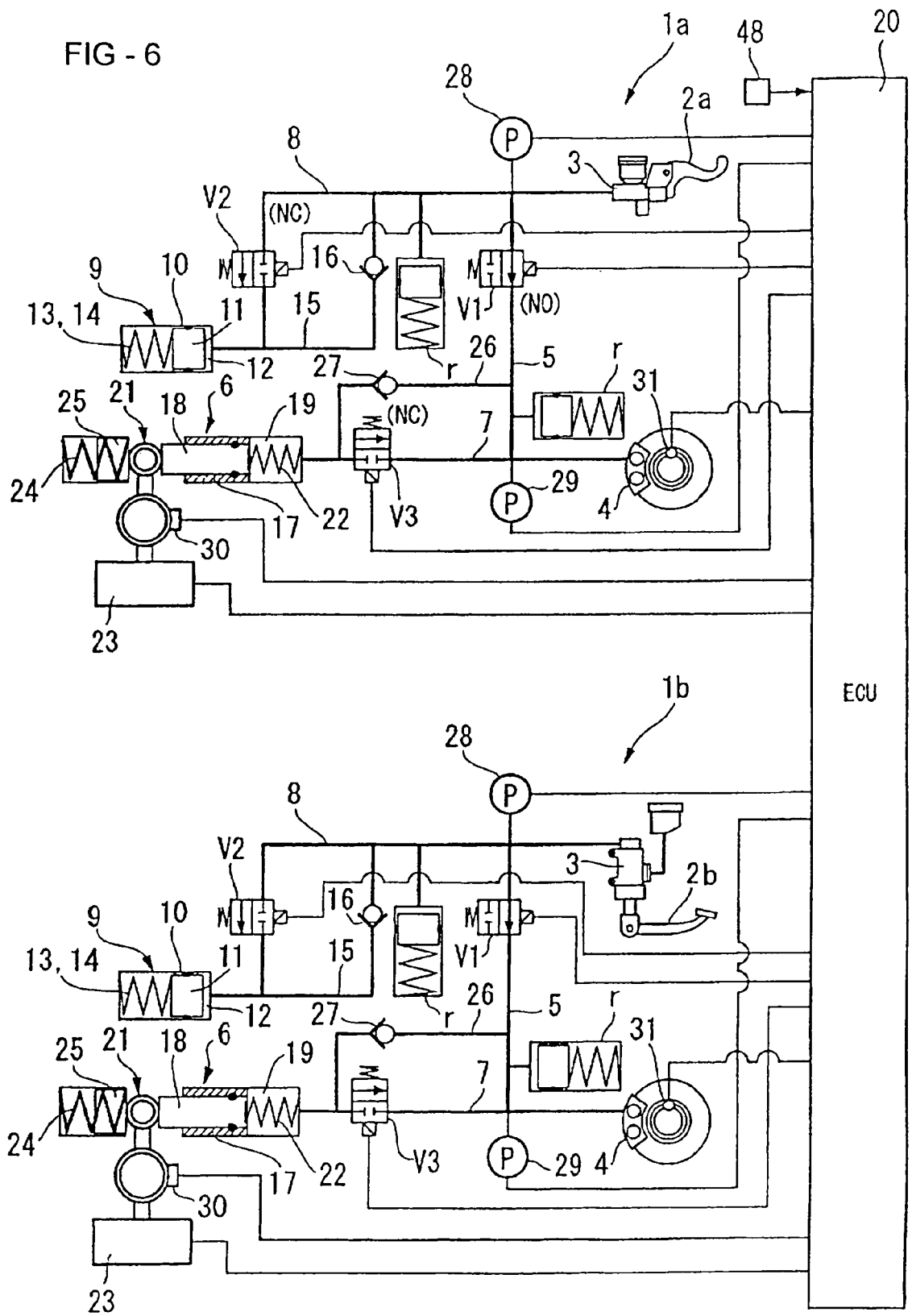
FIG. 6 is a schematic fluid pressure circuit diagram of an electronic braking device for a motorcycle according to a second embodiment of the present invention in which the vehicle is at a stop (velocity=0).

FIG. 6 is a hydraulic circuit diagram of a braking device for a motorcycle according to a second embodiment of the present invention. As shown in the figure, the braking device in this embodiment consists of a front wheel brake circuit 1a and a rear wheel brake circuit 1b which are independent from each other and connected via an electronic control unit (ECU) 20.

As in the first embodiment, the front wheel brake circuit 1a and the rear wheel brake circuit 1b of the second embodiment are structurally substantially the same except that for brake control, the front wheel brake circuit 1a relies on a brake lever 2a as a brake operating unit 2 and the rear wheel brake circuit 1b relies on a brake pedal 2b as a brake operating unit 2. Therefore, only the front wheel brake circuit 1a will be described in detail, and the elements of the rear wheel brake circuit 1b which are the same as those of the front wheel brake circuit 1a are designated by the same reference numerals and their descriptions are omitted.

The braking device of the second embodiment employs an electronic (by-wire) system for both the front and rear wheels where the amount of operation (fluid pressure in this embodiment) of a brake operating unit such as the brake lever 2a is electrically detected, and a fluid pressure which is produced by a hydraulic modulator 6 according to the detected value is used to generate a braking force.

The braking device also employs a combined brake system (CBS) and an antilock braking system (ABS), as described above.

In the second embodiment, the brake circuits 1a and 1b each comprise a master cylinder 3 interlocked with the brake operating unit 2, and a brake caliper (braking member) 4 operatively connected to the master cylinder 3. The master cylinder 3 and the brake caliper 4 are connected by a main brake passage 5. A hydraulic modulator 6 (previously described) is joined and connected to a mid portion of the main brake passage 5, through a supply-drain passage 7.

A normally-open type (NO) first electromagnetic valve V1, which connects or disconnects the master cylinder 3 and the brake caliper 4, is inserted in the main brake passage 5 at a location between the master cylinder 3 and the supply-drain passage 7. A branch passage 8 is connected to the main passage 5 between the master cylinder 3 and the first electromagnetic valve V1. In this embodiment, in the brake circuits 1a and 1b, the portion from the first electromagnetic valve V1 to the master cylinder 3 is defined as the brake input side. Moreover, the portion from the first electromagnetic valve V1 to the brake caliper 4 is defined as the brake output side. The branch passage 8 includes a normally-closed type (NC) second electromagnetic valve V2 connected to a fluid loss simulator 9 (previously described). The fluid loss simulator 9 applies a pseudo hydraulic reaction force to the master cylinder 3 according to the extent of operation of the brake operating unit 2 when the above first electromagnetic valve V1 closes the main brake passage 5. When a reaction force is applied, this second electromagnetic valve V2 opens the branch circuit 8 to connect the master cylinder 3 and the fluid loss simulator 9.

The branch passage 8 includes a bypass passage 15 which passes around the second electromagnetic valve V2. In this bypass passage 15, there is a return check valve 16 which permits flow of working fluid from the fluid loss simulator 9 toward the master cylinder 3.

A third normally-closed type (NC) valve V3 (hydraulic modulator electromagnetic valve) is inserted in the supply-drain passage 7. In the supply-drain passage 7 there is a bypass passage 26 which passes around the third electromagnetic valve V3. In the bypass passage 26 there is a check valve 27 which permits flow of working fluid from the hydraulic modulator 6 toward the brake caliper 4.

In the front wheel brake circuit 1a and the rear wheel brake circuit 1b, on the input side, that is, in the portion of the circuit from the first electromagnetic valve V1 to the master cylinder 3, there is a pressure sensor (P: fluid pressure sensor) 28. In addition, on the output side, that is, in the portion of the circuit from the first electromagnetic valve V1 to the brake caliper 4, there is a pressure sensor (P: second fluid pressure sensor) 29. A relief valve unit (pressure reduction means) r is provided which, when a working fluid pressure above a prescribed level is applied, prevents input of such fluid pressure. A relief valve unit r is disposed on a branch from the main brake passage 5 adjacent to each respective pressure sensor 28, 29.

Figure 7:
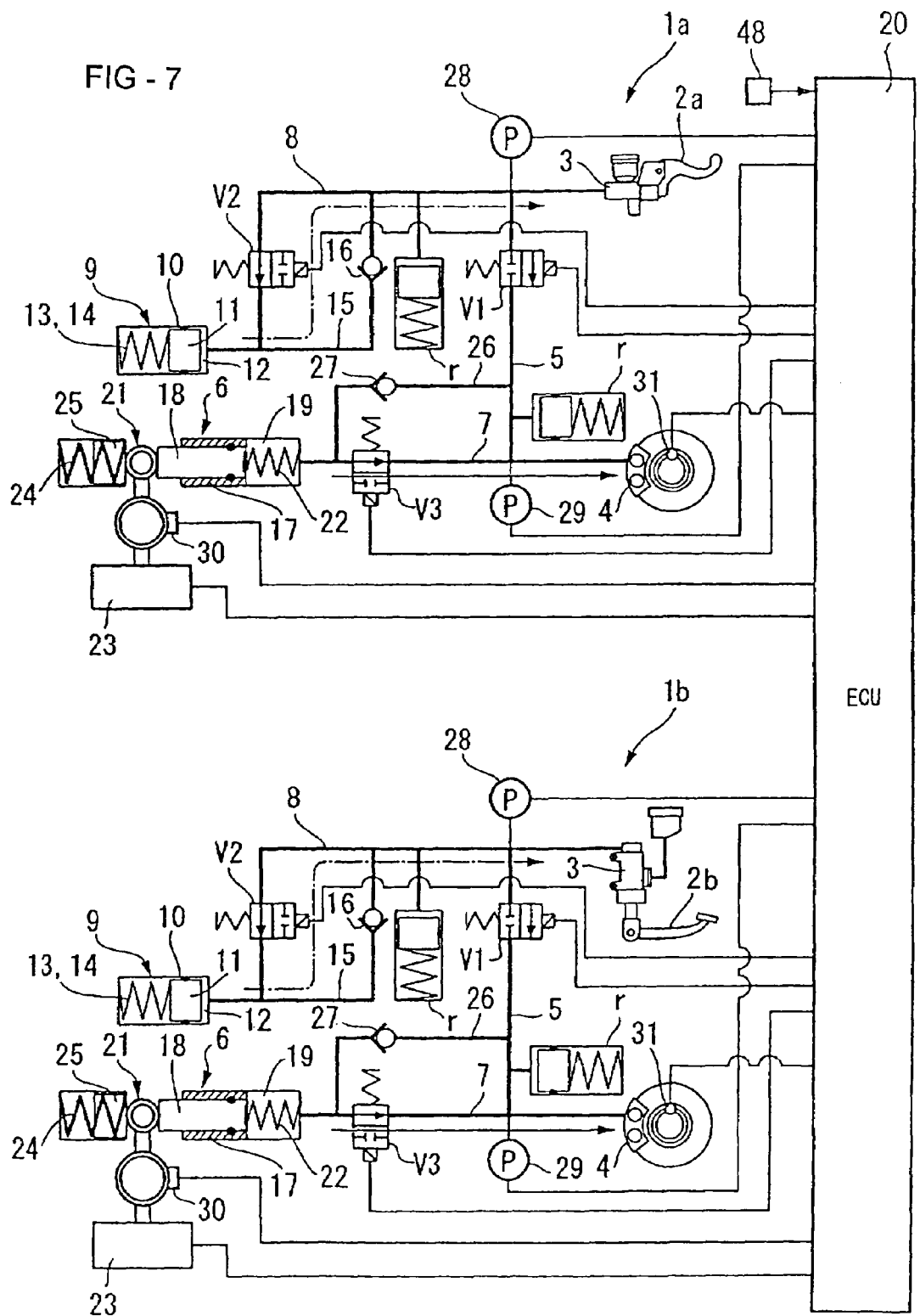
FIG. 7 is a schematic fluid pressure circuit diagram of the electronic braking device of FIG. 6 during operation of the brake lever.
Figure 8:
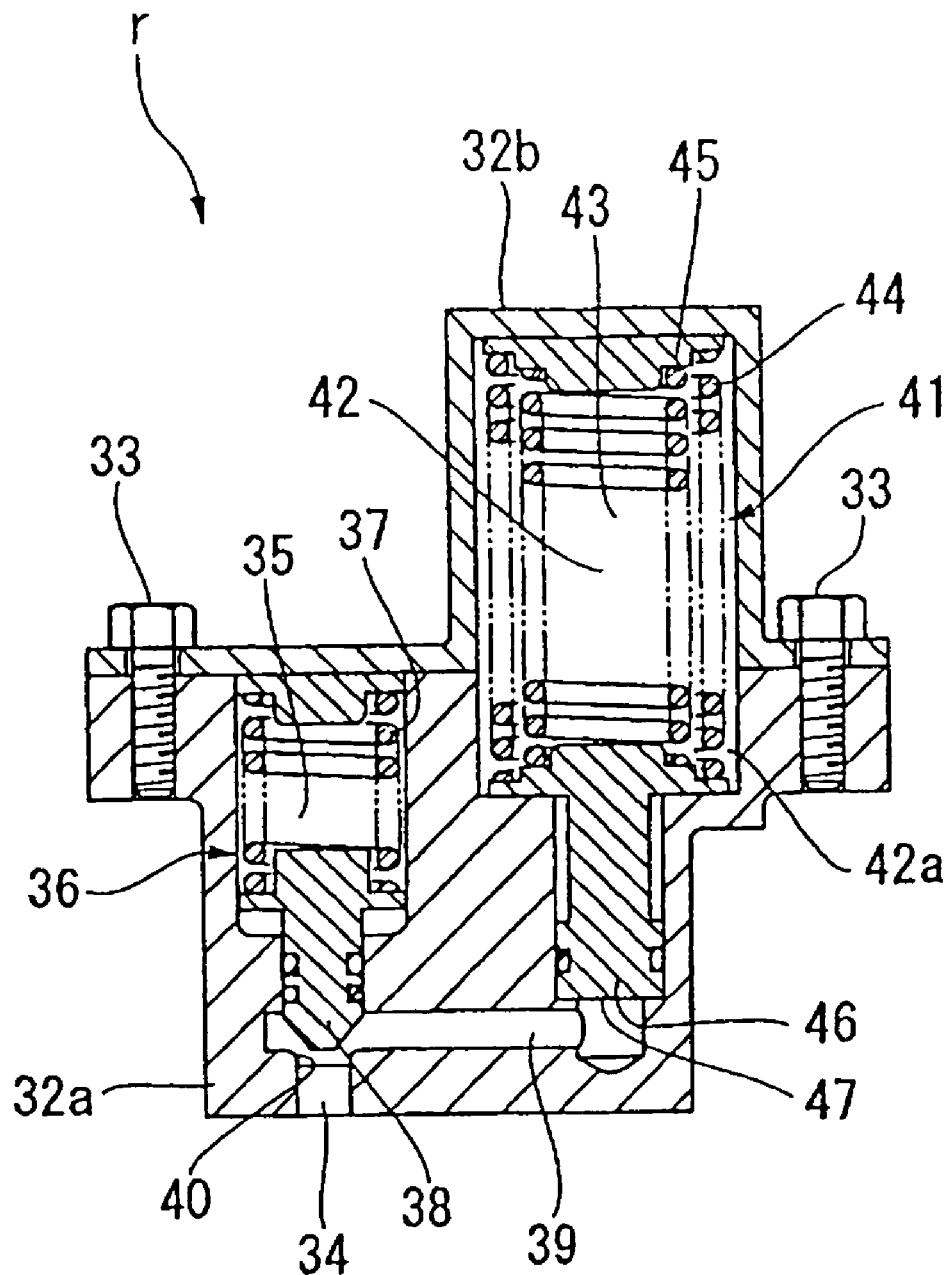
FIG. 8 is a side sectional view of the relief valve unit r.

As shown in FIG. 8, the relief valve unit r consists of a relief valve body 32*a* with a cover member 32*b* fixed on it with a bolt 33. The relief valve body 32*a* is connected to a branch passage of the main brake passage 5 (see FIGS. 6, 7) and has a first inlet passage 34 continuous with a second inlet passage 39 (explained later). Above the first inlet passage 34, a relief valve 36 is provided in a receptacle 35 formed in the relief valve body 32*a*. This relief valve 36 is composed of a coil spring 37 housed in the receptacle 35 and a valve plug 38, which is biased toward the first inlet passage 34 by this coil spring 37. The valve plug 38 contacts the periphery (valve seat) 40 of the opening of the first inlet passage 34, which is open to the second inlet passage 39, in order to close the first inlet passage 34.

The second inlet passage 39 extends in the relief valve body 32*a* perpendicularly to the first inlet passage 34, with one end of it connected with a receptacle 42 for an accumulator 41. The receptacle 42 for the accumulator 41 is composed of a receptacle part 42*a* formed in the relief valve body 32*a*, and a vacant part 43 formed in a way to protrude the cover 32*b* outward. The receptacle 42, which houses two coil springs 44 and 45, forms an inner space of the accumulator 41, which receives a pressure. The two coil springs 44 and 45 reduce compressive load on each other and improve durability.

Concretely, the two coil springs 44 and 45 are disposed so as to bias a plunger 46. The pressure receiving surface 47 of the plunger 46 is in the vicinity of the abovementioned end of the second inlet passage 39. The plunger 46, two coil springs 44 and 45, and receptacle 42 constitute the accumulator 41. The coil spring 37 of the relief valve 36 is designed to have an elasticity that enables it to be compressed or deformed with a pressure lower than the tolerance of the respective pressure sensor 28, 29. Similarly, the coil springs 44 and 45 of the accumulator 41 are designed to have an elasticity that enables them to be compressed or deformed with a pressure lower than the tolerance of the respective pressure sensor 28, 29.

The valve opening pressure of the valve plug 38 of the relief valve 36, which is set by the elasticity of the coil spring 37, is higher than the fluid pressure (for example 15 MPa or so) which is produced when the rider uses full braking power. Thus, the valve plug 38 does not open during normal braking operation, so that the brake feeling is not unfavorably affected. Needless to say, the pressure sensors 28 and 29 used in the brake circuits 1*a* and 1*b* tolerate pressures higher than the fluid pressure in full braking.

The cam shaft (not shown) of the cam mechanism 21 has an angle sensor 30 for angle information feedback, and the brake caliper 4 has a wheel speed sensor 31 for detecting the wheel speed. Also, a mode select switch 48 is provided to enable the rider to select the control mode manually. If the rider desires CBS control, he/she uses the mode selector switch 48 to select the CBS control mode. The following explanation is based on the assumption that CBS control is selected.

The ECU 20 opens or closes the first electromagnetic valve V1, second electromagnetic valve V2, and third electromagnetic valve V3 according to detection signals from the pressure sensors 28 and 29, a detection signal from the angle sensor 30 and a detection signal from the wheel speed sensor 31, and controls operation of the electric motor 23.

Concretely, when the brake operating unit 2 is operated, the speed of the front/rear wheel is inputted from the wheel speed sensor 31 to the controller 20 and information on the amount of brake operation, etc. is inputted by means of the pressure sensor 28 to the ECU 20, and according to an instruction from the ECU 20, the first electromagnetic valves V1 in both the brake circuits are maintained so as to close the main brake passages 5 and at the same time the electromagnetic valves V2 and V3 are held open, and both the hydraulic modulators 6 supply a fluid pressure, depending on the vehicle driving condition and brake operation, to the respective brake calipers 4.

In the above configuration, when the vehicle is at a stop (vehicle speed=0), as shown in FIG. 6, in the front wheel brake circuit 1*a* and rear wheel brake circuit 1*b*, the first electromagnetic valve V1 is open, the second electromagnetic valve V2 is closed and the third electromagnetic valve V3 is closed. Therefore, the electromagnetic valves V1, V2, and V3 do not require any electric power.

Then, when the rider operates the brake lever 2*a* as the brake operating unit 2 for the front wheel, as shown in FIG. 7, in the front wheel brake circuit 1*a*, the first electromagnetic valve V1 closes and the second electromagnetic valve V2 and third electromagnetic valve V3 open. Hence, the main brake passage 5 is disconnected from the master cylinder 3 by closing of the first electromagnetic valve V1 and at the same time the master cylinder 3 and the fluid loss simulator 9 are connected through the branch passage 8 and the main brake passage 5 by opening of the second electromagnetic valve V2. In addition, the fluid loss modulator 6 and the brake caliper 4 are connected through the supply-drain passage 7 and the main brake passage 5 by opening of the third electromagnetic valve V3.

On the other hand, in the rear wheel brake circuit 1*b* as well, at the same time, the first electromagnetic valve V1 closes and the second electromagnetic valve V2 and third electromagnetic valve V3 open. Hence, the main brake passage 5 is disconnected from the master cylinder 3 by closing of the first electromagnetic valve V1 and at the same time the master cylinder 3 and the fluid loss simulator 9 are connected through the branch passage 8 and the main brake passage 5 by opening of the second electromagnetic valve V2. In addition, the fluid loss modulator 6 and the brake caliper 4 are connected through the supply-drain passage 7 and the main brake passage 5 by opening of the third electromagnetic valve V3.

This gives the rider brake feelings on the front and rear wheel sides which are virtually reproduced by the fluid loss simulators 9 in the front and rear wheel brake circuits 1*a* and 1*b* (see the chain line arrow in FIG. 7) and at the same time, change in fluid pressure due to operation of the hydraulic modulator 6 in each circuit is not transmitted to the rider because the first electromagnetic valve V1 is closed. In parallel with this, the electric motor 23 for the hydraulic modulator 6 starts running and the cam mechanism 21 presses the piston 18 to pressurize the working fluid in the hydraulic chamber 19. As a consequence, the fluid pressure, depending on control of the electric motor 23, is supplied through the main brake passage 5 to the brake caliper 4 (see the solid line arrow in FIG. 7).

If the wheel speed sensor 31 detects that the slip ratio of the front wheel or rear wheel (for example, the front wheel in the case of FIG. 7) exceeds a prescribed slip ratio, the ECU 20 controls the electric motor 23 to move the piston 18 back to reduce the braking pressure of the brake caliper 4 and return the slip ratio of the wheel to within a prescribed range by ABS control. At this time, the first electromagnetic valve V1 is closed, and the master cylinder 3 and the hydraulic modulator 6 are disconnected so that pressure change by ABS control is not transmitted to the rider's brake operating unit 2.

The above explanation assumes a case that the brake operating unit 2 is operated but the ABS does not operate and the vehicle stops. However, even when the ABS operates and the vehicle stops, control is achieved in the same manner. In other words, when the ABS operates, it decreases, holds and again increases the pressure in the hydraulic chamber 19. The larger pressure value between the pressure of the master cylinder 3 and the pressure of the brake caliper 4 cannot be identified according to the point at which the vehicle has stopped. Therefore, by adjusting the current value determined by an input duty ratio, through PWM control of the electric motor 23 including its normal and reverse rotation, the position of the piston 18, which is determined by the rotational position of the cam mechanism 21, is electrically adjusted accurately, easily and freely, whether the adjustment is made to increase or decrease the pressure.

If an unwanted excessive external force is applied to the brake operating unit 2 or brake caliper 4, a fluid pressure above a prescribed level might be applied to the first inlet passage 34. In a conventional system, the pressure would directly go to the pressure sensors 28 and 29. In this case, however, the valve plug 38 of the relief valve 36 opens, which opens the second inlet passage 39 and permits the working fluid introduced into the first inlet passage 34 to exit from the first inlet passage 34 and go into the second inlet passage 39. Consequently, the plunger 46 of the accumulator 41 is pressed and the plunger 46 retracts while compressing and changing the shape of the two coil springs 44 and 45, thereby reducing the pressure in the first inlet passage 34 and second inlet passage 39. As a result, the pressure in the main brake passage 5 connected with the first inlet passage 34 is reduced, so that the pressure sensors 28 and 29 are protected from an excessive pressure.

Hence, according to the above embodiment, even in a situation that an unwanted external force suddenly increases the working fluid pressure, the relief valve unit r (relief valve 36) located adjacent to the pressure sensor 28, 29 decreases the fluid pressure which is applied to the main brake passage 5 when reaching the prescribed fluid pressure, so that the pressure sensor 28, 29 is prevented from receiving a fluid pressure beyond its tolerance. Consequently, breakdown of the pressure sensor 28, 29 or change in its input/output characteristics is prevented.

In addition, since the relief valve unit r is located adjacent to the pressure sensor 28, 29, the time lag between the fluid pressure of the pressure sensor 28 (29) and the fluid pressure of the relief valve 36 is minimized, which makes it more certain to prevent the pressure sensor 28, 29 from receiving a fluid pressure beyond its tolerance.

Furthermore, when the upper limit of the fluid pressure tolerance of the pressure sensor 28, 29 is set to the same as the upper limit of the fluid pressure range for normal brake operation, breakdown of the pressure sensor 28, 29 or change in its input/output characteristics is prevented and at the same time an unnecessary increase in cost can be avoided.

Even if an unwanted external force is applied to both or either of the brake operating unit 2 and brake caliper 4 with the electromagnetic valve V1 closed, the relief valve unit r is provided on each of the input side and output side, whereby the pressure sensors 28 and 29 are separately protected.

The present invention is not limited to the above embodiment, but may be embodied in the form of a braking device in which either the input side pressure sensor 28 or the output side pressure sensor 29 is replaced by a plurality of pressure sensors with different measurement ranges. If the pressure sensor is replaced, for example, by a pressure sensor for low pressure (0-3 MPa) and a pressure sensor for high pressure (0-10 MPa) as the above plural pressure sensors, when the elasticity of the relief valve coil springs is set so that the fluid pressure at which the valve plug of the relief valve begins moving away from the valve seat matches whichever has the lower pressure tolerance between the pressure sensor for low pressure and the pressure sensor for high pressure (usually the pressure sensor for low pressure), all the pressure sensors connected with the main brake passage are protected, and breakdown of the pressure sensors and change in their input/output characteristics are substantially prevented.

Further, although a relief valve is provided on both the input side and the output side in the above embodiment, the relief valve may be provided on one side only, that is, either the input side or the output side.

While a working example of the present invention has been described above, the present invention is not limited to the working example described above, but various design alterations may be carried out without departing from the present invention as set forth in the claims.

What is claimed is:

1. A braking device for a vehicle, the braking device comprising:
   a wheel braking member,
   a brake operating unit operatively connected to the wheel braking member such that fluid pressure applied to the wheel braking member changes according to the extent of operation of the brake operating unit,
   a master cylinder operatively connected to the brake operating unit,
   a fluid loss simulator operatively connected to the master cylinder, the fluid loss simulator capable of applying a hydraulic pseudo reaction force to the master cylinder,
   a pressure reducing device, and
   a plurality of fluid pressure sensors for detecting fluid pressure in said master cylinder,
   wherein
   said plurality of fluid pressure sensors includes a first fluid pressure sensor and a second fluid pressure sensor;
   a detection range of said first fluid pressure sensor is lower than that of the second fluid sensor;
   a detection resolution of said first fluid pressure sensor is higher than that of the second fluid sensor; and wherein
   when fluid pressure above a prescribed level is applied to said master cylinder, the pressure reducing device relieves the fluid pressure in the master cylinder.

2. The braking device according to claim 1, wherein said second fluid pressure sensor is a high-pressure fluid pressure sensor and said first fluid pressure sensor is a low-pressure fluid pressure sensor.

3. The braking device according to claim 2, wherein the fluid pressure at which said pressure reducing device begins working is set to a performance limit fluid pressure value of one of the plurality of fluid pressure sensors.

4. The braking device according to claim 2, wherein said second fluid pressure sensor for high pressure detection and said first fluid pressure sensor for low pressure detection overlap in their working ranges.

5. The braking device according to claim 1, wherein the braking device further comprises an electromagnetic valve; and
a main brake fluid passage that extends between said master cylinder and said braking member, wherein
the electromagnetic valve is provided in the main brake fluid passage, and
one of said fluid pressure sensors is disposed between said electromagnetic valve and said master cylinder.

6. The braking device according to claim 5, wherein the braking device further comprises
a hydraulic modulator connected to the main brake fluid passage, and
a hydraulic modulator electromagnetic valve provided between said hydraulic modulator and said wheel braking member,
wherein the second fluid pressure sensor is provided between the hydraulic modulator electromagnetic valve and said wheel braking member.

7. The braking device according to claim 1, wherein said fluid pressure sensors are installed in fluid communication with a hydraulic pipe, and
wherein said pressure reducing device is located adjacent to one of said plurality of fluid pressure sensors in the hydraulic pipe.

8. An electronic braking device for a vehicle, the braking device comprising
a master cylinder,
a wheel braking member connected to the master cylinder by a main brake fluid passage,
a brake operating unit operatively connected to the wheel braking member such that fluid pressure applied to the wheel braking member changes according to the extent of operation of the brake operating unit,
a normally open valve disposed in the main brake fluid passage between the master cylinder and the wheel braking member,
a first pressure sensor disposed between the master cylinder and the valve, the first pressure sensor outputting a first detected pressure,
a second pressure sensor disposed between the master cylinder and the valve, the second pressure sensor outputting a second detected pressure,
a third pressure sensor disposed between the valve and the wheel braking member,
a fourth pressure sensor disposed between the valve and the wheel braking member,
a controller which controls the valve based on detected pressures of the first pressure sensor and the second pressure sensor,
wherein
the first pressure sensor detects a pressure range below that of the second pressure sensor; and
the third pressure sensor detects a pressure range below that of the fourth pressure sensor.

9. The braking device of claim 8, wherein the first pressure sensor detects a pressure range which is lower in pressure, more narrow in range, and of higher resolution relative to that of the second pressure sensor.

10. The braking device of claim 9, wherein the detection ranges of the first pressure sensor and the second pressure sensor partially overlap.

11. The braking device of claim 8, wherein the braking device further comprises a hydraulic modulator for generating hydraulic pressure in the wheel braking member,
the hydraulic modulator connected to the main brake fluid passage between the valve and the wheel braking member,
wherein control of the hydraulic modulator is based on the pressures detected by the third pressure sensor and the fourth pressure sensor.

12. An electronic braking device for a vehicle, the braking device comprising:
a wheel braking member,
a controller which is operable to activate the wheel braking member according to an electronic signal generated in response to a braking request from a driver, and
a plurality of input side fluid pressure sensors for detecting a requested braking amount, each of the plurality of sensors providing an individual output signal to the controller,
a master cylinder operatively connected to said wheel braking member, and
a brake operating unit,
wherein
the input side fluid pressure sensors are different from each other in detection resolution and detection range, the input side fluid pressure sensors comprising a first fluid pressure sensor operable to detect a low pressure range with high resolution, and a second fluid pressure sensor operable to detect both the low pressure range and a high pressure range, the second fluid pressure sensor detecting with a low resolution compared to that of the first fluid pressure sensor, said requested braking amount corresponds to a fluid pressure in the master cylinder which produces working fluid pressure in conjunction with an operation of the brake operating unit;
said input side fluid pressure sensors detect a fluid pressure in said master cylinder, and
the braking device further comprises a plurality of output side fluid pressure sensors provided for detecting an applied fluid pressure on said wheel braking member, wherein the output side fluid pressure sensors are different from each other in detection resolution and detection range.

13. The electronic braking device according to claim 1, wherein said sensors are diagnosed for abnormalities based on the result of detection by said sensors.

14. A braking device for a vehicle, the braking device comprising
a wheel braking member,
a brake operating unit operatively connected to said wheel braking member via a main passage,
a fluid pressure sensor for detecting a fluid pressure applied to said wheel braking member, and
a pressure reducing device, the pressure reducing device comprising a housing, the housing comprising a first receptacle that includes a relief valve, a second receptacle that includes an accumulator, and an internal passage connecting the first receptacle and said second receptacle, the relief valve configured to permit the internal passage to communicate with the main passage under predetermined conditions,
wherein the fluid pressure applied to the wheel braking member changes according to the extent of operation of the brake operating unit, and
wherein when a prescribed fluid pressure is applied to said wheel braking member, the pressure reducing device relieves the fluid pressure in said wheel braking member.

15. An electronic braking device for a vehicle, the braking device comprising:
a wheel braking member, a controller which is operable to activate the wheel braking member according to an electronic signal generated in response to a braking request from a driver, a plurality of sensors for detecting a requested braking amount, and a master cylinder operatively connected with said wheel braking member, wherein the sensors are different from each other in detection resolution and detection range, the sensors detect a fluid pressure in said master cylinder, and the sensors include at least fluid pressure sensors for low pressure and fluid pressure sensors for high pressure; and when the fluid pressure is below a prescribed level, the result of detection by a fluid pressure sensor for low pressure is used by the controller, and when the fluid pressure is above the prescribed level, the result of detection by a fluid pressure sensor for high pressure is used by the controller.

16. A braking device for a vehicle, the braking device comprising:

a wheel braking member, a brake operating unit operatively connected to the wheel braking member such that a fluid pressure applied to the wheel braking member changes according to the extent of operation of the brake operating unit, a master cylinder interlocked with the brake operating unit, a main brake fluid passage formed between the master cylinder and the wheel braking member, an electromagnetic valve disposed in the main brake fluid passage, a fluid loss simulator operatively connected to the master cylinder, the fluid loss simulator capable of applying a hydraulic pseudo reaction force to the master cylinder, a first pressure reducing device connected to the main brake fluid passage formed between the valve and the master cylinder, a first fluid pressure sensor for detecting the fluid pressure in said master cylinder, the first fluid pressure sensor connected to the main brake fluid passage between the valve and the master cylinder, a second pressure reducing device connected to the main brake fluid passage between the valve and the wheel braking member, and a second fluid pressure sensor for detecting the fluid pressure in the wheel braking member, the second fluid pressure sensor connected to the main brake fluid passage in an area between the valve and the braking member; wherein each of said first pressure reducing device and said second pressure reducing device includes a housing, the housing comprising a first receptacle that includes a relief valve, a second receptacle that includes an accumulator, and an internal passage connecting the first receptacle and said second receptacle, the relief valve configured to permit the internal passage to communicate with the main brake fluid passage under predetermined conditions; and each of said first pressure reducing device and said second pressure reducing device is configured to prevent input of a fluid pressure higher than a respective prescribed fluid pressure.

* * * * *